United States Patent Office  3,435,121
Patented Mar. 25, 1969

3,435,121
ARC POWER RESPONSIVE CONTROL SYSTEM FOR CONSUMABLE ELECTRODE FURNACE
Harold S. Jackson, Troy, N.Y., assignor to Allegheny Ludlum Steel Corporation, Brackenridge, Pa., a corporation of Pennsylvania
Filed Mar. 17, 1966, Ser. No. 535,073
Int. Cl. H05b 7/18
U.S. Cl. 13—13  13 Claims

ABSTRACT OF THE DISCLOSURE

Described is a new and improved electrode control system for arc melting furnaces, particularly those powered by a three-phase alternating current supply, which utilizes a signal proportional to average arc melting power to control and maintain the furnace electrode or electrodes. The system additionally includes means for measuring the power factor of the power supply system as well as arc current, and adjusts the electrode position to compensate for off-normal values of these parameters.

Prior art regulating systems for direct arc furnaces generally are responsive to arc voltage and arc current. The electrode position is usually regulated by maintaining a certain ratio between the arc voltage and the arc current in the well-known impedance regulator. However, controlling the electrode position by arc impedance alone does not give accurate melting information, inasmuch as the melting power does not bear a linear relationship to arc impedance. In the arc impedance regulator, as the voltage changes the regulator will make a corresponding linear change in arc current or vice versa. The arc melting power, on the other hand, will achieve a maximum at a particular value of current and then the power decreases as the current increases or decreases from that particular value of current.

In some melting practices it may be desirable to operate at any point on the curve of arc melting power versus current, for example in the long arc region where power increases with decreasing current, or in the maximum arc melting power region. Prior art systems have been unable to effectively regulate the position at all points along this curve in all operating regions. Furthermore, such systems have lacked the flexibility needed in electric arc furnaces of the direct arc or three-phase consumable electrode type. In addition, prior art systems utilizing a signal proportional to the power as a regulating signal have failed to adequately compensate for rapid fluctuations in the power signal, thereby resulting in unnecessary control movements of the electrode to compensate for the fluctuations. In addition, the power losses in the circuit vary from phase to phase, and ideal melting would require the balancing of the arc melting power of each phase, possibly resulting in different circuit power for each phase.

Accordingly, it is an object of this invention to provide a new and improved electrode control system for an arc furnace.

It is a further object of this invention to provide a new and improved electrode control system for a three-phase electric furnace.

It is another object of this invention to provide a new and improved electrode control system for a three-phase electric arc furnace that utilizes a signal proportional to the arc melting power to control and maintain the position of the electrodes.

It is a still further object of this invention to provide a new and improved electrode control system for an electric arc furnace wherein an electrical signal proportional to arc current is utilized to distinguish the current or gap direction in order to raise or lower the electrode to the point of desired arc melting power.

Still another object of this invention is to provide a new and improved electrode control system for an electric arc furnace wherein an electrical signal proportional to the power factor is utilized to distinguish the current or gap direction in order to raise or lower the electrode to the point of desired arc melting power.

It is an additional object of this invention to provide a new and improved electrode control system for a three-phase electric arc furnace wherein the electrode can be positioned to operate the furnace within three distinct melting regions.

It is still an additional object of this invention to provide a new and improved electrode control for an alternating current electric arc furnace by providing means for automatically controlling transformer tap changing in order to operate the furnace at a desired power factor.

Briefly, the present invention accomplishes the above cited objects by providing a regulating and control system that electrically compares a signal proportional to the desired power with a signal proportional to the average of the actual power. Means are also provided to sense the portion of the arc power curve on which the furnace is operating in order to determine in which direction to drive the electrode in response to the difference between the desired and actual power signals. The sensing means include either a device for sensing the change of arc power with respect to the change in arc current or a device for sensing the power factor value with reference to the power factor for optimum arc melting power. Additional means are also provided to permit overriding the power comparison means and allow control of the electrode according to a desired power factor level.

With either the power factor regulator or the power comparison control, an output signal is produced and fed into suitable electrode motor control means, which means may also incorporate the well-known impedance regulator to control the position of the electrode to the desired melting characteristic.

In order to establish the desired power factor, it is oftentimes necessary that the transformer tap position be alternated during the meltdown cycle. A power factor transducer is provided and receives signals corresponding to the arc current and arc voltage to establish a power factor level which is detected by appropriate circuit means. The output of this circuit means energizes a transformer tap changer automatic control which controls a power circuit breaker and tap changer in the proper sequence to effect the transformer tap change. Additional means are also provided for detecting a short circuit overriding the electrode control and raising the electrode a sufficient distance to clear the short.

Further objects, features and advantages of the invention will become apparent from the following description when taken in conjunction with the accompanying drawings in which.

Figure 1:
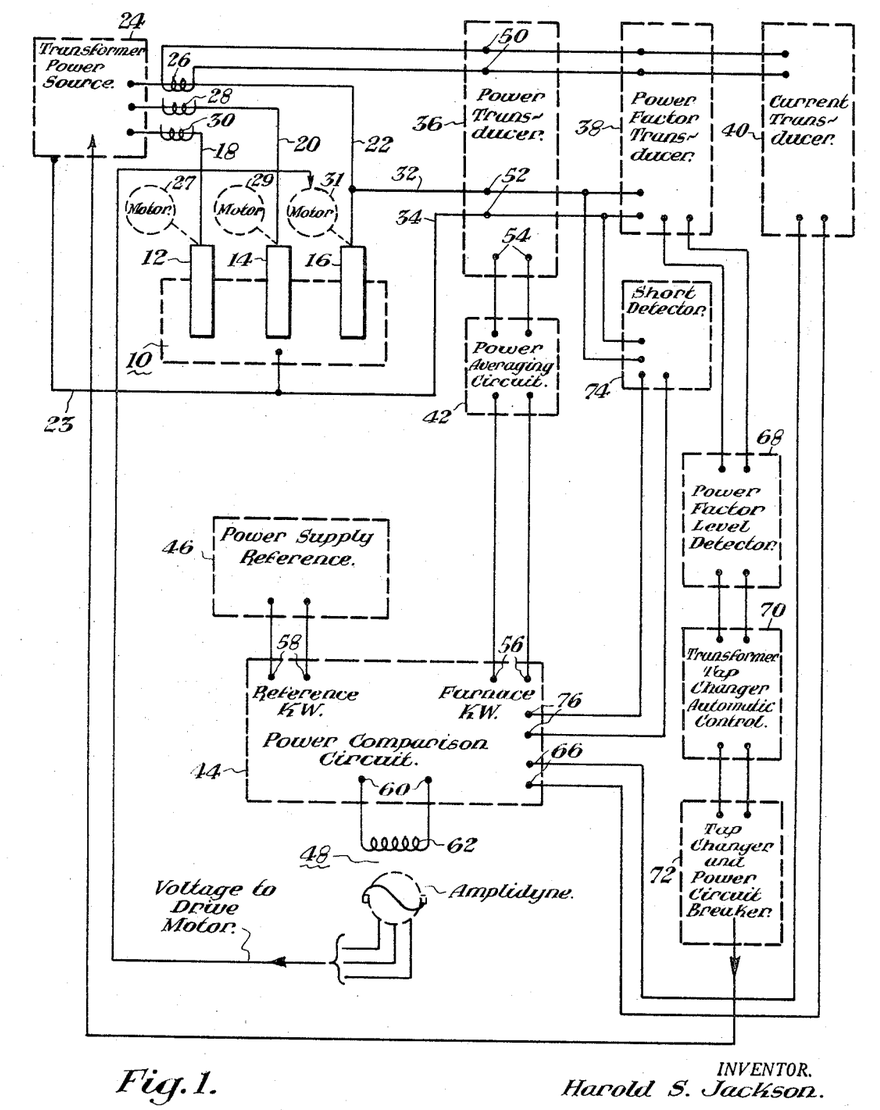
FIG. 1 is a schematic diagram of the basic circuit utilized in this invention.

Referring now to the drawings, there is shown in FIG. 1 a furnace 10 (diagrammatically illustrated by dotted lines) having suspended therein three electrodes 12, 14 and 16, each of which is electrically connected to a three-phase transformer power source 24 through the respective conductors 18, 20 and 22, with the neutral voltage lead 23 connected from power source 24 to the furnace 10. The electrode drive mechanism provides an individual motor for each electrode, the motors 27, 29 and 31 being mechanically coupled to the electrodes 12, 14 and 16 respectively.

Inasmuch as the electrical control circuitry for each phase, and consequently each electrode, is identical, FIG. 1 shows the control circuitry for one electrode only, to wit, electrode 16. To obtain a current signal, a current transformer 26 is inductively coupled to conductor 22 of electrode 16. Similarly, current transformers 28 and 30 are provided for electrodes 14 and 12 respectively. In order to obtain a voltage signal proportional to the arc voltage, a lead 32 is electrically connected to conductor 22 in close proximity to the electrode 16, and a second lead 34 acting as a neutral voltage pickup is suitably electrically connected to the furnace 10.

Three transducers are provided for utilization of the arc current signal and arc voltage signal, a power transducer 36 for measurement of the arc power, a power factor transducer 38, and a current transducer 40.

The basic circuit for controlling the electrode 16 includes the power transducer 36, a power averaging circuit 42, a power comparison circuit 44, a power reference source 46, an amplidyne 48, and the drive motor 31 for electrode 16. The arc current signal from current transformer 26 is fed into power transducer 36 at the terminals 50. Similarly, the arc voltage signal from leads 32 and 34 is electrically connected to the terminals 52 of power transducer 36. The arc current signal and the arc voltage signal are electrically combined to give a direct current output at terminals 54 of power transducer 36, which output is proportional to the in-phase product of the input signals. Due to the fluctuations of the arc current and the arc voltage during the melt down cycle, it is desirable to have an average power reading. Consequently, the output of the power transducer 36 is fed into a power averaging circuit 42 which averages the output of the power transducer 36 over a given period of time. The output of the power averaging circuit 42 is fed into the power comparison circuit 44 at terminals 56. It is then compared with a direct current signal proportional to the desired arc melting power from reference source 46 which is fed into the power comparison circuit 44. This differential signal output is then utilized to regulate suitable power control means, such as amplidyne circuit 48, by feeding the signal into the field winding 62 of the amplidyne circuit. The output of the amplidyne 48 then energizes the motor 31 to drive the electrode 16 up or down according to the polarity of the energy in the field winding 62 of amplidyne 48.

Figure 2:
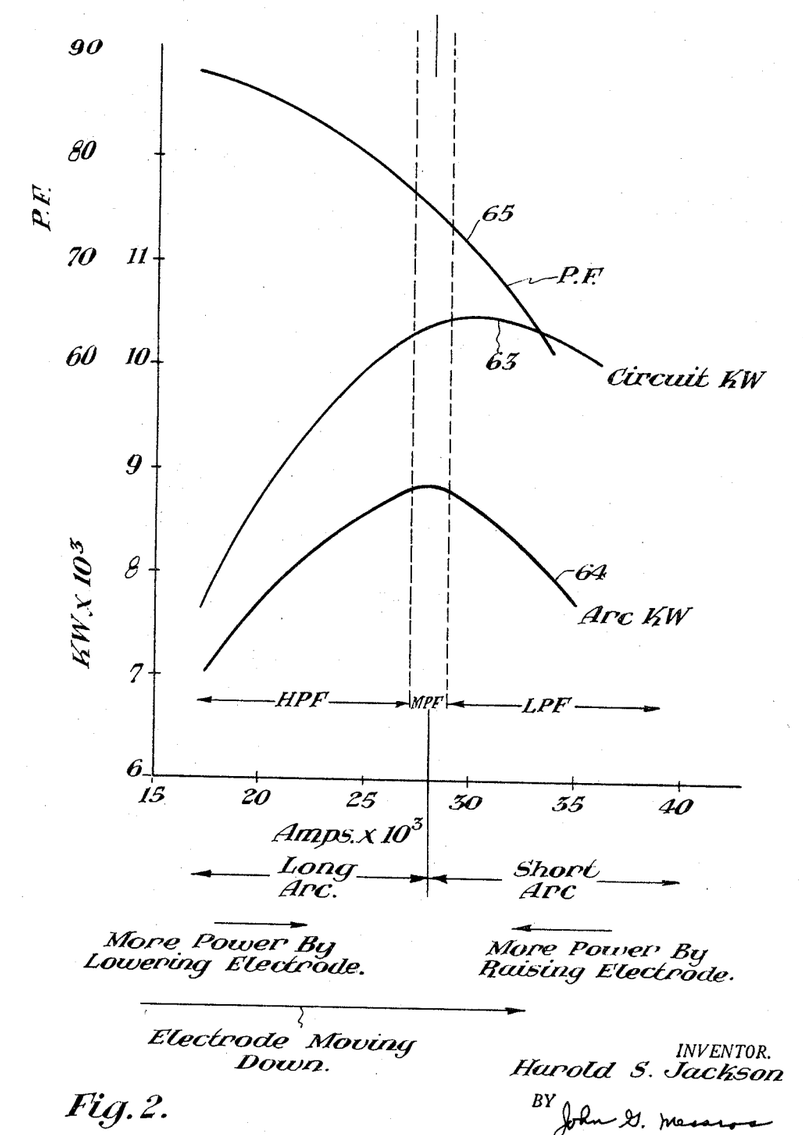
FIG. 2 is a graphical illustration of the electric characteristics of a typical electric arc furnace illustrating the operating regions, and FIGS. 3–5 schematically represent a modified embodiment of an arc electrode regulator according to the invention.

The electrical operating characteristics of the electric arc furnace are represented in FIG. 2 by the curves of circuit power with respect to arc current (curve 63), arc melting power with respect to arc current (curve 64), and power factor with respect to arc current (curve 65). The power factor curve 65 generally decreases with increasing arc current. The circuit power curve 63 increases to a maximum at a power factor of approximately 0.707 and then decreases with increasing arc current. The arc melting power curve 64 increases to a maximum which occurs at a power factor of approximately 0.74 to 0.76. The dividing point for the regions designated "long arc" and "short arc" is the approximate maximum point for the arc melting power curve 64. These and the other operating regions will be explained more fully as the description proceeds.

The electrical characteristics of the electrical arc furnace (FIG. 2) are such that the curve 64 of arc kilowatts vs. arc current is nonlinear. Thus, at the optimum position of the curve 64 a subsequent increase in arc current will result in a decrease in arc power as measured by the power transducer 36. Consequently, it is desirable that sensing means be provided for determining the point of optimum arc melting power. The current transducer 40 receives the arc current signal from current transformer 26 and converts the signal to a direct current output proportional to the arc current. The output of the current transducer 40 is then fed into the power comparison circuit 44 at terminals 66 thereof. To determine which polarity of voltage the amplidyne 48 should generate and, as a result, which direction of rotation the electrode motor 31 shall turn, means are provided within the power comparison circuit 44 to sense a change of arc melting power with respect to arc current. The power comparison circuit 44 is so arranged that if the arc current from current transformer 26 increases with increased power as measured by the power transducer 36, an electrode drive motor 31 drives the electrode 16 down; if the arc current decreases with increased power the electrode motor 31 drives the electrode 16 up to adjust for optimum arc melting power.

In an alternating current arc furnace the power source 24 includes a three-phase transformer having various tap positions for various voltages. The power factor transducer 38 is provided in order to determine what transformer tap shall be used on the power source 24. Ideally, as previously shown in FIG. 2, a power factor of approximately 0.74 to 0.76 is desired for maximum power into the arc. The power factor transducer 38 receives an arc current signal from the current transformer 26, and an arc voltage signal from the leads 32 and 34, and the power factor represents the cosine of the phase angle between the arc current signal and the arc voltage signal, both being alternating current. From the power factor transducer 38 a signal, indicative of the phase angle between the voltage and current signals, is fed into a power factor level detector 68 which compares the actual power factor with the desired power factor of approximately 0.74 to 0.76. If the actual power factor is different from the desired power factor, the power factor level detector 68 provides an output signal proportional to the difference. If the desired power is less than the actual power and the power factor range is approximately 0.74 to 0.76, the output signal energizes electrical circuit means identified as a transformer tap changer automatic control 70 which in turn controls the tap changer and power circuit breaker mechanism 72 in the proper sequence in order to first withdraw the electrode, break the circuit, change the tap of the transformer power source 24, then reclose the circuit breaker for the resumption of melting. As a result, the melting is accomplished automatically on the most efficient transformer tap.

In the event of a short circuit between the electrode 16 and the scrap charge, it is necessary to clear the short circuit by raising the electrode. In order to accomplish this, a short detector 74 is provided to receive an arc voltage signal from the leads 32 and 34 connected to the electrode 16 in the furnace 10, respectively. Upon the occurrence of a short circuit, the detector 74 detecting low voltage provides an electrical signal to terminals 76 of power comparison circuit 44. This signal actuates appropriate electrical means within the power comparison circuit 44 to electrically disconnect the other inputs and provide a signal to the output terminals 60 of the power comparison circuit 44 to energize the field winding 62 of amplidyne circuit 48 in such a direction to raise the electrode 16 a sufficient distance to clear the short circuit.

In operation, the power for the arc furance 10 is received from a three-phase alternating current transformer power source 24 which usually has a plurality of taps for operation on any one of a number of different voltages. The power from source 24 is fed to the electrodes 12, 14 and 16 through the conductors 18, 20 and 22 with the arc at electrode 16 constituting one leg of a three-phase load. The return path for the power is provided by conductor 23 connected to the furnace 10. The arc current signal from current transformer 26, and the arc voltage signal connected via leads 32 and 34 to lead 22 of the electrode 16 and the furnace 10 respectively, are fed into the power transducer 36 and electrically combined to give a power signal at terminals 54, which output is proportional in magnitude to the product of the in-phase arc current signal and the arc voltage signal. During the melt down cycle the melting power in the arc between the electrode and the charge to be melted will vary, sometimes rapidly as melting proceeds. Consequently, the electrode current and the electrode voltage will fluctuate. As a result, it is desirable to minimize control variations due to these fluctuations to minimize hunting, overshort and unnecessary control action on the electrode's movement. The power signal is therefore fed into the power averaging circuit 42 to average the power signal over some period of time. The average power signal is then compared with a reference signal from power supply reference 46, which signal is proportional in magnitude to the desired arc melting power in a power comparison circuit 44. The power comparison circuit 44 produces an output signal proportional to the difference between the respective power signals. This output then energizes appropriate motor control means, such as amplidyne 48, to energize the electrode drive motor 31 until such time as the respective power signals are again equal. The power averaging circuit 42 prevents movement of the electrode 16 unnecessarily during melt down.

As can be seen from curve 64 in FIG. 2 for a given arc melting power it is possible for the control mechanism to operate at two different points on the curve when the arc melting power is below the maximum. The lower current ratings correspond to the electrode operating in a long arc position, and the higher current ratings indicate a short arc position. Since the control mechanism can operate at one of two stable points on the curve for a given power rating, it is necessary to know in which direction to drive the electrode 16, that is, whether to increase or decrease the arc length to drive the arc melting power toward the desired position. In order to sense this, a current transducer 40 is provided to receive the arc current signal from current transformer 26 and produce an output signal proportional thereto, which output signal to the power comparison circuit 44 is utilized to determine a polarity for the differential output of the power comparison circuit 44 at terminals 60. Sensing means for the arc current signal are provided in the power comparison circuit 44 to determine generally whether the arc current is operating at arc current ratings within the "long arc" region or the "short arc" region (FIG. 2). Such sensing means can be, for example, a bistable unit for reversing the polarity of the output depending upon the condition of the bistable. With such a bistable unit a dead zone can also be defined for a certain range of arc melting currents near the optimum arc melting power position. As can be seen from the relationship of power factor curve 65 and arc melting power curve 64, the power factor can be utilized for sensing by actuating appropriate means for conditions above or below the power factor corresponding to maximum arc melting power.

Thus, if the electrode 16 were positioned for long arc operation, and the power signal from power supply reference 46 indicated more power, the arc current signal of current transducer 40 would designate that the arc melting power was operating in the long arc region. This arc current signal would drive the sensing means to designate a polarity for the output of the power comparison circuit 44, the polarity being in such a direction to drive the electrode 16 downwardly to decrease the arc length for more power. Similarly, if the electrode were operating in the short arc position, and more power was called for by the power signal from the power supply reference 46, the arc current signal from current transducer 40 would call for the opposite polarity of the output of the power comparison circuit 44 to ultimately drive the electrode 16 upwardly to increase the arc length and increase the arc melting power.

As can be seen by comparison of curves 64 and 65 of FIG. 2, at the maximum arc melting power on curve 64 the power factor on curve 65 is approximately 0.74 to 0.76. It is therefore also desirable to operate the three-phase transformer power source 24 at or near the power factor corresponding to the maximum arc melting power. The power factor can be adjusted by varying the amount of inductance in the power circuit which is generally accomplished by changing the voltage tap on the transformer power source 24 to add or subtract windings from the transformer, and/or changing the series reactance. In this invention this is accomplished automatically by providing a power factor transducer 38 into which is fed an arc current signal from current transformer 26, and an arc voltage signal through leads 32 and 34, which signals are electrically combined to provide an output proportional in magnitude to the power factor. This output then energizes a power factor level detector 68 which determines the actual power factor with respect to the desired power factor range of 0.74 to 0.76. If the actual power factor is in the range of the desired power factor, and the actual power is less than the desired power, an output is provided to energize a transformer tap changer automatic control 70 which determines whether the tap or the transformer power source 24 is to be changed in a direction to increase the inductance or decrease the inductance. The output from the transformer tap changer automatic control 70 then actuates the appropriate mechanism of the tap changer in power circuit breaker 72 in the proper sequence to change the tap of the transformer power source 27 in such a direction to bring the power back to the desired level.

Figure 3:
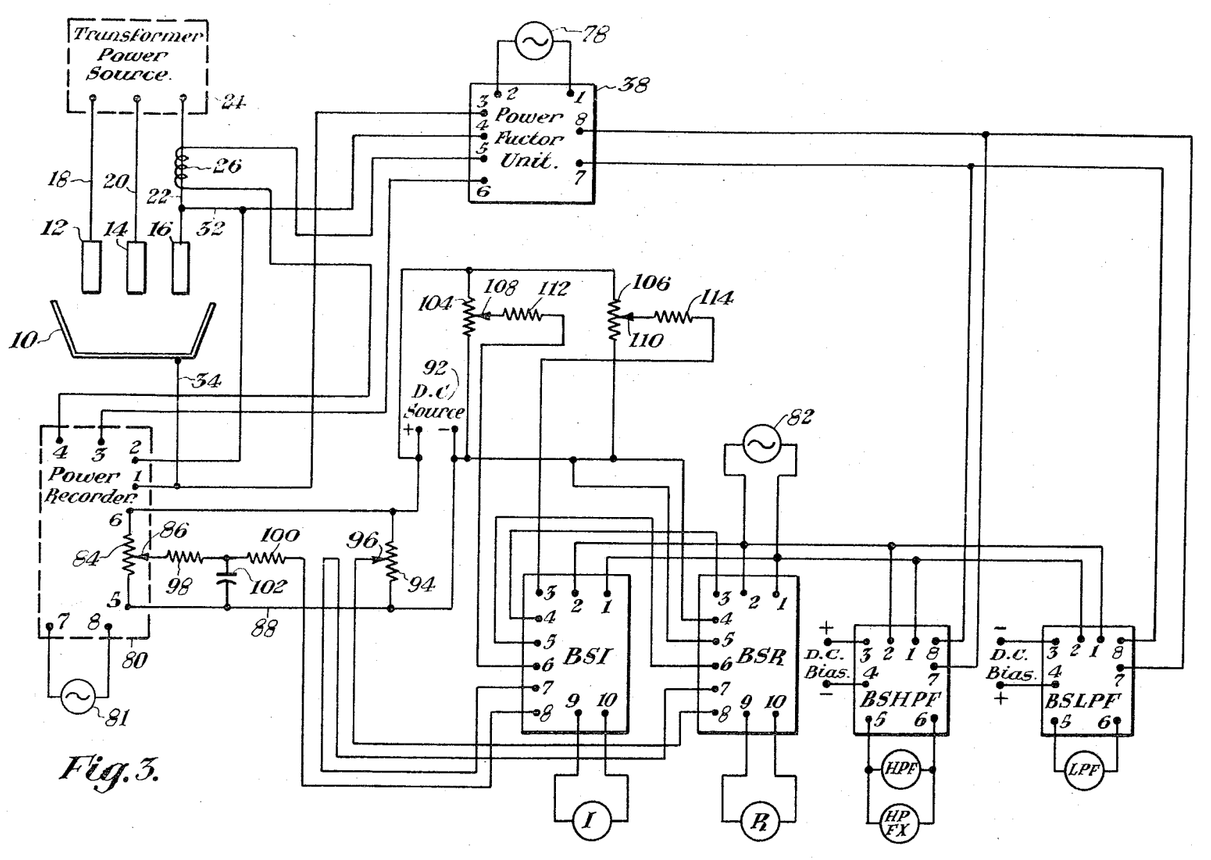
Figure 4:
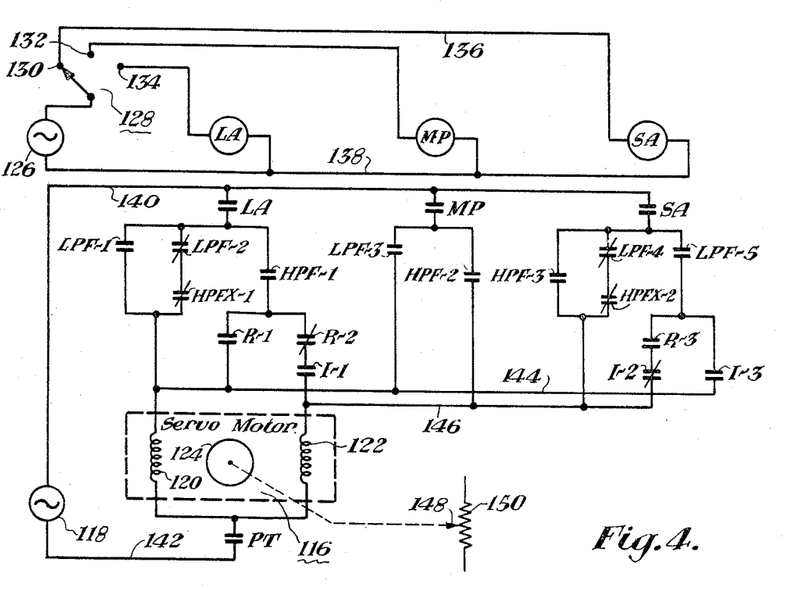
Figure 5:
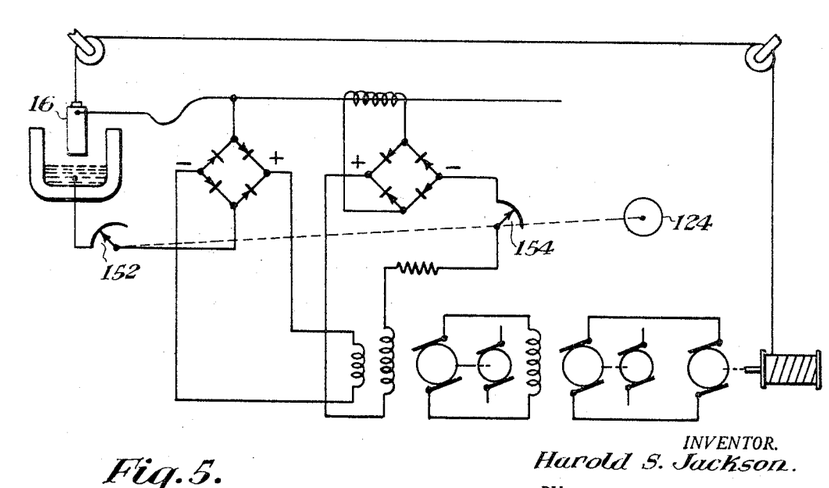

There is shown in FIGS. 3-5 a modified embodiment of the system of FIG. 1 in which a standard arc impedance regulator is modified to respond to a signal proportional to the power or to the power factor. Similar components bear the same numerical designation as in FIG. 1. Starting with FIG. 3 there is shown the furnace 10 having suspended therein three electrodes 12, 14 and 16, each connected through its conductor 18, 20 and 22, respectively, to a three-phase transformer power source 24. It is to be understood that the circuitry depicted and described herein is for the electrode 16 of one phase only, as in FIG. 1, and similar circuitry is also provided for the other two electrodes 12 and 14. Inductively coupled to the conductor 22 of electrode 16 is a current transformer 26 to provide an arc current signal input to terminals 5 and 6 of power factor unit 38. A signal proportional to the arc voltage is provided by the leads 32 and 34 which are connected to conductor 22 of electrode 16 and the furnace 10 respectively. This arc voltage is then fed into terminals 3 and 4 of the power factor unit 38. The power factor unit 38 can be of any type which provides a direct current output proportional to the power factor as determined by the input signals of arc voltage and arc current. The power factor unit 38 is connected to a source of alternating current 78 at terminals 1 and 2. Terminals 7 and 8 are provided for the power factor unit 38 to provide an output which will be discussed hereinafter.

The arc current signal from current transformer 26 is also supplied to a power recorder 80 at terminals 3 and 4 thereof. Similarly the arc voltage signal from leads 32 and 34 is supplied to the terminals 1 and 2 of the power recorder 80. Alternating current power is supplied to terminals 7 and 8 from power source 81.

Four bistable magnetic amplifier units are provided to accomplish the necessary switching action, the bistable units being indicated by the letters BS with the subsequent letters designating the respective functions. The bistable unit SBI switches "on" upon a demand to increase the power. The bistable unit BSR switches "on" upon a demand to reduce the power. The bistable unit BSHPF is energized upon a signal showing a high power factor from the power factor unit 38, and correspondingly the bistable unit BSLPF is energized upon the showing of a low power factor from the power factor unit 38. The functions and operations of the bistable units will be discussed more fully in conjunction with the operation of the circuit. The bistable units can be of any well-known construction having a power winding, a load winding, and the appropriate number of control windings.

The bistable units BSI and BSR are similar, each having terminals designated 1 through 10, the power being supplied from a source of alternating current 82 to the terminals 1 and 2 of the respective units. There are three control windings in the bistable units BSI and BSR, one pair being designated terminals 3–4, a second control winding at terminals 5–6, and a third control winding at terminals 7–8. The output of the bistable unit BSI is provided at terminals 9–10 to which is electrically connected the coil of a relay I which is energized during the "on" position of the bistable unit BSI. Similarly, the bistable unit BSR has electrically connected to its load terminals 9–10, the coil of a relay R which likewise is energized during the "on" condition of bistable unit BSR.

The bistable units BSHPF and BSLPF are similar in construction and have terminals designated 1 through 8. The power is supplied from the source of alternating current 82 to terminals 1–2 of each of the bistable units BSHPF and BSLPF. A fixed D.C. bias is applied to one of the control windings via terminals 3–4 of each of the respective bistables, the polarity of the bias to each unit being reversed as shown by the polarity designations for energizing the respective bistables in response to values above or below a preset dead band value corresponding to the medium power factor region (MPF) as shown in FIG. 2. The control windings of BSHPF and BSLPF designated by the terminals 7–8 thereof are connected in parallel and electrically connected to the output terminals 7–8 of the power factor unit 38. Connected to the load terminals 5–6 of the bistable unit BSHPF are two relay coils connected in parallel, the coils being designated HPF and HPFX. Electrically connected to the load terminals 5–6 of the bistable unit BSLPF is a relay coil LPF.

Located within the power recorder 80 is a slide wire resistor 84 having a movable center tap 86, the movement of which is controlled by the measurement of power in the power recorder 80 as determined by the arc voltage signal input at terminals 1–2, and the arc current signal input at terminals 3–4 thereof. The ends of the resistor 84 are electrically connected to terminals 5–6 of power recorder 80 and are connected by leads 88 and 90, respectively, to a direct current power source 92. Connected in parallel with the resistor 84 is a control or reference rheostat 94 having a movable tap 96 which is set to a position indicative of the desired input power. The rheostat 94 can be operator-controlled, or programmed, if desired. It is to be understood that in the three-electrode circuit the three reference rheostats similar to reference rheostat 94 will be controlled simultaneously. This can be accomplished, for example, by having the three rheostats on one shaft.

A current path is established between slide wire resistor 84 and rheostat 94 by a series circuit from movable tap 86 of resistor 94 through a first resistor 98, a second resistor 100, through a control winding of bistable unit BSI at terminals 8–7 thereof, through a control winding of bistable unit BSR at terminals 7–8 thereof to the movable tap 96 of reference rheostat 94. The control windings of bistable units BSI and BSR are connected in opposing relation so that only one unit will be energized for a given direction of current flow which will be dependent upon the relative voltage differential existing between movable taps 86 and 96 of slide wire resistor 84 and rheostat 94 respectively. As can be seen, a bridge circuit is thus established with the unbalance current flowing through the opposing control windings of bistable units BSI and BSR, the direction of current flow determining whether to energize the "increase" power bistable BSI or to energize the "reduce" power bistable BSR.

A capacitor 102 is inserted between lead 88 and the junction point of resistors 98 and 100. This capacitor 102 and resistor 98 cooperate to form an RC circuit for averaging the power as indicated by the movement of tap 86 of slide wire resistor 84 in power recorder 80. Any sudden movements of the movable tap 86 which would ordinarily result in sudden fluctuations of the unbalance current of the bridge circuit will be filtered or dampened by the RC circuit of resistor 98 and capacitor 102. The net effect would be that meaningless fluctuations in the arc power would not result in unnecessary movement of the electrodes to instantaneously compensate for the changes.

Connected in parallel with the direct source 92 is a pair of rheostats 104 and 106, each having a movable tap 108 and 110 respectively. The rheostats 104 and 106 serve as voltage dividers to regulate the supply of current to control windings of the bistable units BSI and BSR.

The rheostat 104 serves as a bandwidth control for the bistable units BSI and BSR by providing an initial bias to the control windings of each unit at terminals 6–5 thereof. The ampere-turns on both control windings are in the same direction with terminal 6 of each unit being positive with respect to terminal 5 thereof. The power is supplied to these control windings from the movable tap 108 of rheostat 104 through current-limiting resistor 112 to the control winding of bistable unit BSI at terminals 6–5 thereof through the control winding of bistable unit BSR at terminals 6–5 thereof to the negative terminal of the direct current source 92. The amount of current through these control windings varies the bandwidth by adjusting the position of the tap 108 on the rheostat 104.

The rheostat 106 serves to compensate for power loss in the electrode lead 22. An average power loss for the electrode lead 22 is computed, and this value is used to determine the setting for movable tap 110 of rheostat 106 in order to bias a control winding in each of the bistable units BSI and BSR to compensate for the power loss in lead 22. Although the current in electrode lead 22 fluctuates and, consequently, the lead power loss fluctuates, compensation by means of rheostat 106 is preset at one level according to average furnace conditions. The power is supplied to the control windings from movable tap 110 of rheostat 106 through current-limiting resistor 114 to the control winding of bistable unit BSI at terminals 3–4 thereof, through the control winding of bistable unit BSR at terminals 3–4 thereof to the negative terminal of direct current source 92. The ampere-turns thus provided to each control winding at terminals 3–4 of the respective bistable units are in the same direction, the terminal 3 of each unit being positive with respect to terminal 4 thereof.

The ampere-turns of the control winding at terminals 3–4 opposes the ampere-turns of the control winding at terminals 6–5 of each unit, thereby resulting in a bias control equal to the difference of the ampere-turns. This will establish an initial operating point for each of the bistable units BSI and BSR, which operating point will be affected by energization of the control windings of terminals 7–8 of each unit as herein discussed.

There is shown in FIG. 4 the contact circuitry energized by the relays of the circuit of FIG. 3. A servo motor 116 receives power from an alternating current source 118 when the appropriate contacts are in the closed position to complete the circuit from the source 118 to either of the two field windings 120 and 122 of servo motor 116. One field winding 120, for example, will rotate the rotor 124 of servo motor 116 in one direction to cause the electrode 16 to raise, and the other field winding 122 when energized will cause the electrode 16 to lower. In addition to the relays of FIG. 3 there are provided three additional relays designated LA, MP, and SA functionally representing long arc, maximum power, and short arc conditions. The three relays are energized from a source of alternating current 126 through a three-position selector switch 128. In the circuitry illustrated, the relay SA receives power from alternating current source 126 over contact 130 of selector switch 128 through lead 136 to the relay coil SA through lead 138 to the other terminal of power source 126. Similarly, the relay coil MP can be energized by switching the selector switch 128 to its contact 132. Also, relay coil LA can be energized by switching the selector switch 128 to contact 134 thereof.

A relay contact shown as normally closed contact PT is provided for periodic timing of the contact circuitry. This contact PT is energized by a timing relay PT (not shown). Inasmuch as the timing contact PT is in series with the power source 118, opening contact PT will result in interruption of the contact circuitry which will cause the servo motor 116 to remain at its last energized position, thereby maintaining the position of electrode 16 during the "open" cycle of relay contact PT. The relay contact PT, along with its two equivalent contacts in the remaining phases, will share the time on a one-third "closed," two-thirds "open" basis, thereby keeping unnecessary movements of electrode 16 to a minimum.

As can be seen in FIG. 4, three distinct primary circuits are provided through the appropriate contacts for energizing the servo motor 116. Each circuit is then again subdivided into two possible paths to energize either the "raise" field winding 120, or the "lower" field winding 122. The three distinct primary circuits are established through contact LA of relay LA, or through contact MP of relay MP, or through contact SA of relay SA. Only one of these contacts is closed at a given time depending upon the position of the selector switch 128. This switch 128 can be manually controlled by an operator to pick out a long arc condition (LA), a maximum power condition (MP), or a short arc condition (SA) for operation of the arc furnace (See FIG. 2). If desired, the selector switch 128 can also be programmed.

Assuming that the selector switch 128 closes the circuit at contact 132, the coil of relay MP will be energized thereby picking up contact MP. Further assuming that bistable unit BSLPF is in its energized condition, relay LPF will be energized, thereby closing relay contact LPF-3. Thus, a circuit will be completed from power source 118 over lead 140 through closed contact MP through closed contact LPF-3 through lead 144 to field winding 120 of servo motor 116 through closed contact PT through lead 142 to the other terminal of power source 118. This condition will cause a raising of electrode 16. It is to be remembered that if bistable unit BSLPF is energized, representing a low power factor, then bistable unit BSHPF is not energized. Consequently, only one field winding 120 of servo motor 116 can be energized.

On the other hand, if bistable unit BSHPF is in its "on" condition, then relay contact LPF-3 will open and relay contact HPF-2 will close, thereby completing a circuit from one terminal of power source 118 through lead 140 through closed contact MP through closed contact HPF-2 through lead 146 to field winding 122 of servo motor 116 through normally closed contact PT through lead 142 to the other terminal of power source 118. This condition will result in a lowering of the electrode 16. This action shuts off after the electrode drives to the position for maximum power. Assuming that the selector switch 128 makes contact with terminal 134 thereof, the coil of relay LA will be energized from power source 126. A circuit is thus immediately established from power source 118 through lead 140 through closed contact LA through normally closed contact LPF-2 through normally closed contact HPFX-1 through field winding 120 of servo motor 116 through normally closed contact PT through lead 142 to power source 118. If, however, bistable unit BSLPF is in its "on" condition, normally opened contact LPF-1 will close, and contact LPF-2 will open, thereby completing the same circuit through contact LPF-1 which is in parallel with the two normally closed contacts LPF-2 and HPFX-1 which are in series. Assuming that bistable unit BSHPF is in its "on" condition, then relay coils HPF and HPFX will be energized thereby causing relay contacts HPF-1 to close, and HPFX-1 to open. Further assuming that the bridge circuitry previously described is unbalanced in such a way to energize bistable unit BSR, the relay R will be energized thereby closing normally opened contact R-1, and opening normally closed contact R-2. Thus, a circuit will be completed from power source 118 through lead 140 through closed contact LA through closed contact HPF-1 through closed relay contact R-1 through field winding 120 of servo motor 116 through normally closed contact PT through lead 142 to the power source 118. Alternately, if bistable unit BSI is energized and bistable unit BSR is in its "off" condition, relay coil I will be energized to pick up normally closed contact I-1. A circuit will then be completed from power source 118 through lead 140 through closed contact LA through closed contact HPF-1 through normally closed contact R-2 through closed contact R-1 through field winding 122 of servo motor 116 through normally closed contact PT through lead 142 to power source 118. As can be seen, if neither bistable unit BSI nor BSR is energized, neither field winding will be energized with the bistable unit BSHPF energized.

With the selector switch 128 in the position shown, the relay coil SA will be energized over contact 130 of selector switch 128 from the power source 126 with relay contact SA picked up. A circuit is immediately completed from power source 118 through lead 140 through closed contact SA through normally closed contact LPF-4 through normally closed contact HPFX-2 through lead 146 through field winding 122 of servo motor 116 through normally closed contact PT through lead 142 to power source 118. If bistable unit BSHPF is energized, relay contact HPFX-2 will open, and normally opened contact HPF-3 will close, thereby energizing the same field winding 122 over relay contact HPF-3 which is in parallel with the two normally closed contacts LPF-4 and HPFX-2 which are in series. Assuming bistable unit BSLPF is in its "on" condition, normally closed contact LPF-4 will open and normally closed contact LPF-5 will pick up. If neither bistable unit BSI nor unit BSR is energized (indicating a balanced bridge circuit) the servo motor 116 will not be energized due to the normally opened contact R-3 in one branch, and the normally opened contact I-3 in the other branch. As can be seen by reference to the description relating to the long arc position, the circuits in the short arc position are similar in construction and operation with the exception that the energized field windings are reversed. With the bistable unit BSR energized along with the bistable unit BSLPF, relay coil R and relay coil LPF will be energized to thereby energize field winding 122 of servo motor 116 over contact LPF-5 over closed contact R-3 over normally closed contact I-2 through lead 146 to field winding 122. Conversely with bistable unit BSI energized, normally closed contact I-2 will drop away and normally opened contact I-3 will be picked up. Thus field winding 120 of servo motor 116 will be energized over contact LPF-5 over closed contact I-3 through lead 144 to field winding 120.

The rotation in either direction of the rotor 124 of servo motor 116 varies the position of the center tap 148 of a rheostat 150 as shown in FIG. 4 by the dotted line connection between the rotor 124 and the movable tap 148 indicating the mechanical connection. The function of the above-described circuitry will be discussed more fully in connection with the operation.

FIG. 5 shows a circuit for an arc impedance control of an electric arc furnace. This circuit is shown and described in U.S. Patent No. 3,097,252 issued July 9, 1963 to C. G. Robinson. Inasmuch as this circuit is incidental to the invention, the only parts that will be referred to herein are those necessary to adequately describe the invention.

The rheostats designated 152 and 154 in FIG. 5 are located respectively in the arc voltage signal circuit and the arc current signal circuit. In the standard impedance control system these two rheostats 152 and 154 are varied simultaneously to regulate the arc impedance. In FIG. 5 the rheostats 152 and 154 are shown as being mechanically coupled and controlled by the rotor 124 of the servo motor 116 shown in FIG. 4. The rheostats 152 and 154 are symbolically represented by the single rheostat 150 in FIG. 4.

In order to better understand the operation of the circuit, reference is made to FIG. 2 wherein the curve 63 represents the circuit power, the curve 64 represents the arc power, and the curve 65 represents the power factor curve. The regions designated HPF, MPF, and LPF are respectively the high power factor region, the medium power factor region and the low power factor region. The graph also illustrates the long arc region and the short arc region with the dividing point being the vertical line on the graph representing the point on curve 64 for the maximum arc power.

Referring now to FIGS. 3 through 5, the operation of the invention will become apparent. The control system described herein is fully automatic and depends upon the setting of two control elements for its operation. These two elements are the reference rheostat 94 (FIG. 3) and the selector switch 128 (FIG. 4). While these two control elements can be manually controlled by an operator, they can also be suitably controlled by any well-known programming method.

Assuming a first condition where the selector switch 128 (FIG. 4) is positioned at contact 132, the operating condition for maximum power (MP) is established. By observing the circuitry for the relay contact MP it can be seen that only one of two branch circuits can be completed, that is, either bistable unit BSHPF is energized in which event bistable unit BSLPF is deenergized, or the bistable unit BSLPF is energized with bistable unit BSHPF deenergized. If the signal from output terminals 7-8 of power factor unit 38 corresponds to a high power factor, then this input signal is received at terminals 7-8 of bistable unit BSHPF which assumes an "on" condition to thereby energize relay coils HPF and HPFX at output terminals 5-6 of the bistable unit BSHPF. At this point the circuit will be operating in the region designated HPF on curve 64 of FIG. 2. It can be seen from curve 64 that in order to bring the operation of the circuit into the maximum power region designated by the pair of vertical dotted lines, it will be necessary to lower electrode 16. Thus, by the energization of relay coil HPF, relay contact HPF-2 will close in order to complete a circuit from power source 118 through lead 140 through closed relay contact MP through closed relay contact HPF-2 through lead 146 through field winding 122 of servo motor 116 through normally closed relay contact PT through lead 142 to the power source 118. The field winding 122, which as previously discussed represents the "lower" winding, will cause the rotor 124 of servo motor 116 to rotate in a direction to control the mechanically coupled rheostats 152 and 154 in such a direction to cause the lowering of electrode 16. As the electrode 16 is lowered, by referring to FIG. 2 it will be seen that the arc current increases along the curve 64 of arc power. When the arc current increases to a point on curve 64 within the dotted line region, the power factor unit 38 will have a zero output thereby deenergizing bistable unit BSHPF causing relay coil HPF to deenergize and its relay contact HPF-2 to drop away. If the arc current should increase along curve 64 past the medium power factor region designated MPF and into the region designated LPF, the power factor unit 38 will have an output at terminals 7-8 thereof indicating a low power factor. This signal when received at terminals 7-8 of bistable unit BSLPF will cause the unit to achieve an "on" condition, thus energizing relay coil LPF at output terminals 5-6 thereof. Consequently, relay contact LPF-3 will pick up to complete a circuit from AC source 118 through lead 140 through closed relay contact MP through closed relay contact LPF-3 through lead 144 through field winding 120 of servo motor 116 through normally closed contact PT through lead 142 to power source 118. As previously discussed, field winding 120 will energize servo motor 116 in such a way to cause rotation of rotor 124 to rotate in a direction to vary rheostats 152 and 154 causing the electrode 16 to raise. The raising of the electrode 16 will move the operating point of the arc furnace along curve 64 of FIG. 3 toward the maximum power region within the dotted line, thereby decreasing arc current while increasing arc power.

As can be seen by an examination of FIGS. 2 through 5 in the maximum power position, the reference rheostat 94 has no control over the operation of the system. At this position the system is strictly a power factor measurement and control system to maintain the operating point of the arc furnace within the maximum power factor (MPF) region of curve 64 in FIG. 2.

Assuming the selector switch 128 making contact with contact 134, relay coil LA will be energized, thereby establishing long arc operating conditions for the furnace. Further assuming at this time that the furnace is operating in the low power factor region designated LPF in FIG. 2, the following circuit will be completed. The bistable unit BSLPF will be energized from the output of power factor unit 38 thereby energizing relay coil LPF causing relay contact LPF-1 to pick up, and relay contact LPF-2 to drop away. A circuit will thus be completed from AC power source 118 through lead 140 through closed relay contact LA through closed relay contact LPF-1 through field winding 120 of servo motor 116 through closed relay contact PT through lead 142 to the power source 118. Consequently, the energization of the "raise" field winding 120 will cause the rotor 124 of servo motor 116 to rotate in such a direction to vary rheostats 152 and 154 causing the electrode 16 to raise. The electrode 16 will continue in an upward direction until such time as the furnace operating point comes within the maximum power factor (MPF) region within the dotted lines of FIG. 2. At this point bistable unit BSLPF will deenergize, causing relay contact LPF-2 to pick up to its normally closed position and relay contact LPF-1 will drop away. In the maximum power factor region, bistable unit BSHPF will also be deenergized, thus the "raise" field winding 120 of servo motor 116 will continue to be energized from closed relay contact LA through normally closed relay contact LPF-2 through normally closed relay contact HPFX-1. Inasmuch as the two normally closed relay contacts LPF-2 and HPFX-1, which are in series, are in parallel with relay contact LPF-1, the electrode 16 will therefore continue to raise until the operating point is within the high power factor region designated HPF. At this point bistable unit BSHPF will be energized upon receipt of the signal from the power factor unit 38 to thereby actuate relay coils HPF and HPFX. Normally closed relay contact HPFX-1 will then drop away to open the circuit between the power source 118 and the field winding 120 of servo motor 116. Simultaneously, relay contact HPF-1 will pick up in the branch circuit but the servo motor 116 will not be energized unless either bistable unit BSI or bistable unit BSR is energized. The energization of bistable unit BSI and BSR depends on the condition of the bridge circuit previously discussed. If at this point the movable tap 96 of reference rheostat 94 is at the same potential as the movable tap 86 of slide wire resistor 84 in the power recorder 80, no current will flow through the control windings of either bistable unit. This would obviously correspond to the desired power being equal to the arc power.

If, however, reference rheostat 94 is adjusted so that the potential at tap 96 thereof is lower than the potential at tap 86 of slide wire resistor 84, then an unbalance current will flow through the control windings in bistable units BSI and BSR. The direction of current will be from tap 86 of slide wire resistor 84 through resistors 98 and 100 through the control winding at terminals 8-7 of bistable unit BSI through the control winding at terminals 7-8 of bistable unit BSR to movable tap 96 of rheostat 94. In order for the current flowing through a control winding of either bistable unit to energize the unit, the direction of flow must be from the lower numerically designated terminal to the higher numerically designated terminal. This provision is established for reference purposes only and is not to be construed as limiting the invention. Inasmuch as the current flow in the control winding of bistable unit BSI is from terminal 8 to terminal 7, bistable unit BSI remains in its "off" condition while the flow in bistable unit BSR is in a direction from terminal 7 to terminal 8, thereby energizing bistable unit BSR. Relay coil R at output terminals 9-10 of bistable unit BSR will be energized causing relay contact R-1 to close and normally closed relay contact R-2 to open. This condition will call for a reduction in power to the furnace. As seen in FIG. 4, a circuit will be completed from AC source 118 through lead 140 through closed relay contact LA through closed relay contact HPF-1 through closed relay contact R-1 through lead 144 through field winding 120 of servo motor 116 through closed relay contact PT through lead 142 to the AC source 118. This will cause rotor 124 of servo motor 116 to rotate mechanically coupled rheostats 152 and 154 in a direction to raise electrode 16. As can be seen in FIG. 2 on curve 64, an increase in arc length will cause a decrease in arc power in the high power factor (HPF) region. As the arc power decreases the power recorder 80 senses the decrease in power causing movable tap 86 of slide wire resistor 84 therein to adjust itself to the point whereby the potential at tap 86 is equal to the potential at tap 96 of rheostat 94.

Conversely, if reference rheostat 94 is adjusted to such a position to cause the potential at tap 96 of rheostat 94 to be higher than the potential at tap 86 of slide wire resistor 84, then the unbalance current will flow in a direction from movable tap 96 toward movable tap 86 thereby causing the energization of bistable unit BSI, and the deenergization of bistable unit BSR. Therefore relay contact R-1 will drop away and relay contact R-2 will pick up upon the deenergization of bistable unit BSR. Simultaneously, the energization of relay coil I will cause normally open relay contact I-1 to pick up to complete a circuit from power source 118 through lead 140 through closed relay contact LA through closed relay contact HPF-1 through normally closed relay contact R-2 through closed relay contact I-1 through field winding 122 of servo motor 116 through normally closed relay contact PT through lead 142 to power source 118. The rotor 124 of servo motor 116 will then rotate mechanically coupled rheostats 152 and 154 in such a direction to cause electrode 16 to lower. As shown in FIG. 2 by the curve 64 of arc melting power, the lowering of electrode 16 will cause an increase in arc melting power in the high power factor (HPF) region. With the increase in arc power the tap 86 of slide wire resistor 84 in power recorder 80 will adjust to a point where the bridge is again balanced causing the deenergization of bistable unit BSI, and the opening of relay contact I-1 to interrupt the circuit to servo motor 116.

In the short arc position the electrode switch 128 makes a contact with contact 130 as shown in FIG. 4, and relay coil SA will be energized from power source 126 thereby establishing short arc operating conditions for the furnace. Assuming at this time that the furnace is operating in the high power factor region designated HPF in FIG. 2, bistable unit BSHPF will be energized from the output of power factor unit 38, thereby energizing relay coils HPF and HPFX causing relay contact HPF-3 to pick up and relay contact HPFX-2 to drop away. A circuit will thus be completed from AC power source 118 through lead 140 through closed relay contact SA through closed relay contact HPF-3 through lead 146 through field winding 122 of servo motor 116 through closed relay contact PT through lead 142 to the power source 118. Consequently, the energization of the "lower" field winding 122 will cause the rotor 124 of servo motor 116 to rotate in such a direction to vary rheostats 152 and 154 causing the electrode 16 to lower. The electrode 16 will continue in a downward direction until such time as the furnace operating point comes within the maximum power or medium power factor region designated MPF within the dotted lines of FIG. 2. At this point bistable unit BSHPF will deenergize causing relay contact HPFX-2 to pick up to its normally closed position and relay contact HPF-3 will drop away. In the maximum power region, bistable units BSHPF and BSLPF will both be deenergized, thus the "lower" field winding 122 of servo motor 116 will continue to be energized from closed relay contact SA through normally closed relay contact LPF-4 through normally closed relay contact HPFX-2. Inasmuch as the two series connected normally closed relay contacts LPF-4 and HPFX-2 are in parallel with relay contact HPF-3, the electrode 16 will therefore continue to lower until the operating point is within the low power factor region designated LPF in FIG. 2. At this point bistable unit BSLPF will be energized upon receipt of the signal from the power factor unit 38 to thereby actuate relay coil LPF. Normally closed relay contact LPF-4 will then drop away to open the circuit between the power source 118 and the field winding 122 of servo motor 116. Simultaneously, relay contact LPF-5 will pick up in the branch circuit but the servo motor 116 will not be energized unless either bistable unit BSI or bistable unit BSR is energized. The energization of bistable units BSI and BSR depends on the condition of the bridge circuit of FIG. 3 as previously discussed. If at this point the movable tap 96 of reference rheostat 94 is at the same potential as the movable tap 86 of slide wire resistor 84 in the power recorder 80, no current will flow through the control windings of either bistable unit. This would obviously correspond to the situation wherein the desired or reference power is equal to the arc power.

If, however, reference rheostat 94 is adjusted so that the potential at tap 96 thereof is lower than the potential tap at 86 of slide wire resistor 84, then an unbalance current will flow through the control windings in bistable units BSI and BSR. The direction of current will be from tap 86 of slide wire resistor 84 through resistor 98 and 100 through the control winding at terminals 8-7 of bistable unit BSI through the control winding at terminal 7-8 of bistable unit BSR to movable tap 96 of rheostat 94. As previously mentioned, energization of either bistable unit depends on the direction of current flow through its respective control winding. Inasmuch as the current flow in the control winding of bistable unit BSI is from terminal 8 to terminal 7, bistable unit BSI remains in its "off" condition while the flow of current in control winding of bistable unit BSR is in a direction from terminal 7 to terminal 8 thereby energizing bistable unit BSR. Relay coil R at output terminals 9-10 of bistable unit BSR will be energized causing relay contact R-3 to pick up. This condition will call for a reduction in power to the furnace. As seen in FIG. 4, a circuit will be completed from AC source 118 through lead 140 through closed relay contact SA through closed relay contact LPF-5 through closed relay contact R-3 through normally closed relay contact I-2 through lead 146 through field winding 122 of servo motor 116 through closed relay contact PT through lead 142 to power source 118. This will cause rotor 124 of servo motor 116 to rotate mechanically coupled rheostats 152 and 154 in a direction to lower electrode 16. As can be seen in FIG. 2 on curve 64, a decrease in arc length will result in a decrease in arc power in the low power factor (LPF) region. By comparison with the long arc (LA) operating conditions, it can be observed that a decrease in arc length therein will cause an increase in arc power. Consequently, it is necessary for a flexible control system that the circuitry be able to sense the operating region in order to determine in which direction to drive the electrode in order to increase or decrease the arc power.

Conversely, if reference rheostat 94 is adjusted to such a position to cause the potential at tap 96 of rheostat 94 to be higher than the potential at tap 86 of slide wire resistor 84, then the unbalance current will flow in a direction from movable tap 96 toward movable tap 86 thereby causing the energization of bistable unit BSI, and the attendant deenergization of bistable unit BSR. Therefore, relay contact R-3 will drop away upon the deenergization of bistable unit BSR. Simultaneously, the energization of relay coil I will cause normally closed contact I-2 to drop away and normally open relay contact I-3 to pick up to complete a circuit from power source 118 through lead 140 through closed relay contact SA through closed relay contact LPF-5 through closed relay contact I-3 through lead 144 through field winding 120 of servo motor 116 through closed relay contact PT through lead 142 to power source 118. The rotor 124 of servo motor 116 will then rotate mechanically coupled rheostats 152 and 154 in such a direction to cause electrode 16 to raise. As shown in FIG. 2 by the curve 64 of arc melting power, the raising of electrode 16 will cause an increase in arc melting power in the low power factor (LPF) region. As previously discussed, in the long arc (LA) operating condition to increase the arc power it was necessary to lower the electrode.

Consequently, it can be seen that the above-described system provides an automatic and flexible control system which is readily adaptable to a standard arc impedance control furnace. Maximum flexibility is accomplished by providing a choice of three melting power operating conditions, long arc, short arc, or maximum power. These conditions can be regulated automatically, if desired, by programming the inputs to reference rheostat 94 and selector switch 128 in order to achieve optimum melting in a three-electrode arc furnace.

As is obvious, instead of using power factor to control the furnace, a circuit which compares power change with current change (as in the system of FIG. 1) can be used. If the power increases with an increase in current, relays similar to relays HPF and HPFX are energized. If power decreases with an increase in current a relay similar to relay LPF is energized. If power changes very little with a change in current, no relays are energized indicating the medium power factor (MPF) region. The relays HPF, HPFX and LPF are used in the same way as previously described.

While there have been shown and described specific embodiments, it is to be understood that various other modifications and adaptations can be readily made without departing from the spirit and scope of the inventor.

I claim:

1. An electric arc furnace control system for controlling the position of an electrode in the furnace, said system comprising:
   (a) means for producing a first electrical signal proportional to electrode melting power;
   (b) means for averaging said first signal over some period of time;
   (c) means for producing a second electrical signal proportional in magnitude to the desired electrode melting power;
   (d) means for comparing said average first electrical signal with said second electrical signal to produce a differential output; and
   (e) means responsive to said differential output to control the position of said electrode to the position corresponding to said second electrical signal.

2. In an electric arc furnace control system for controlling the position of an electrode in the furnace, said system comprising:
   (a) means for producing a first control signal proportional to the current flowing through said electrode;
   (b) means for producing a second control signal proportional to the voltage between said electrode and the metal;
   (c) means responsive to said first and second control signals to produce a power signal proportional to the product of said first and second control signals;
   (d) means for averaging said power signal over a period of time;
   (e) means for producing a control signal proportional in magnitude to the desired power level of said arc;
   (f) means for comparing said last mentioned signal with the averaged power signal to produce a differential output; and
   (g) means responsive to said differential output to position said electrode according to said desired power signal.

3. An electric arc furnace control system for controlling the position of an electrode in the furnace, said system comprising:
   (a) means for producing a first electrical signal proportional to the arc power;
   (b) means for averaging said first signal over some period of time;
   (c) means for producing a second electrical signal proportional in magnitude to the desired electrode melting power;
   (d) means for comparing said average first electrical signal with said second electrical signal to produce a differential output having one polarity when said average first electrical signal is greater than said second electrical signal and the other polarity when said second electrical signal is greater than said averaged first electrical signal;
   (e) control means responsive to said differential output to selectively energize first and second circuit means according to the polarity of said differential output, said first and said second circuit means being deenergized when said differential output is zero; and
   (f) means responsive to said control means for positioning the electrode to the position corresponding to the deenergization of said first and said second circuit means.

4. An electric arc furnace control system for controlling the position of an electrode in the furnace, said system comprising:
   (a) means for producing a first electrical signal proportional to the power factor;
   (b) means for producing a second electrical signal proportional to the arc power;
   (c) means for averaging said second signal over some period of time;
   (d) first control means responsive to said first electrical signal to selectively energize a first circuit means according to said first electrical signal being above a predetermined range of values and a second circuit means according to said first electrical signal being below a predetermined range of values, said first and second circuit means being deenergized when said first electrical signal is within said predetermined range of values;
   (e) means for producing a third electrical signal proportional in magnitude to the desired electrode melting power;
   (f) means for comparing said averaged second electrical signal with said third electrical signal to produce a differential output having one polarity when said second electrical signal is greater than said third electrical signal and the other polarity when said third electrical signal is greater than said second electrical signal;

(g) second control means responsive to said differential output to selectively energize third and fourth circuit means according to the polarity of said differential output, said third and said fourth circuit means being deenergized when said differential output is zero; and (h) means responsive to said first control means and said second control means for positioning the electrode to the desired position.

5. An electric arc furnace control system according to claim 4 wherein the last mentioned means is selectively responsive to said first and said second control means for positioning the electrode to the desired position.

6. An electric arc furnace control system for controlling the position of an electrode in the furnace, said system comprising:

(a) means for producing a first electrical signal proportional to the power factor;

(b) means for producing a second electrical signal proportional to the arc power;

(c) means for producing a third electrical signal proportional in magnitude to the desired electrode melting power;

(d) means for comparing said second electrical signal with said third electrical signal to produce a differential output;

(e) first circuit means for controlling the position of the electrode in response to said first electrical signal;

(f) second circuit means for selectively controlling the position of the electrode in response to said first electrical signal and said differential output; and (g) means for selectively actuating said first circuit means and said second circuit means.

7. A control system according to claim 6 wherein means are provided to average said second electrical signal and said averaged second electrical signal is compared with said first electrical signal to produce said differential output.

8. An electric arc furnace control system for controlling the position of an electrode in a furnace of the type which has the operating characteristic that as the arc current increases, the arc melting power increases to a maximum at a given value of arc current and thereafter the arc melting power decreases, said system comprising:

(a) means for producing a first control signal proportional to the electrode melting power;

(b) means for averaging said first signal over some period of time;

(c) means for producing a second control signal proportional to the desired electrode melting power;

(d) means for comparing said averaged first control signal with said second control signal to produce a differential output;

(e) means responsive to said output to control the movement of said electrode; and (f) means for sensing the operating point of said furnace with respect to the point of maximum arc melting power, said sensing means determining the direction of travel of said electrode to drive said electrode in a direction to cause said first control signal to become approximately equal to said second control signal.

9. A control system according to claim 8 wherein said sensing means senses the change of arc melting power with respect to arc current as the electrode moves to determine the operating point of said furnace with respect to the point of maximum arc melting power.

10. A control system according to claim 8 wherein said sensing means senses the power factor of the power into the furnace and compares it with the power factor corresponding to the maximum arc melting power to determine the operating point of said furnace with respect to the point of maximum arc melting power.

11. An electric arc furnace control system for maintaining the power factor at a generally predetermined level in an arc furnace supplied from a movable tap transformer source, said system comprising:

(a) means for producing a first signal proportional to the power factor of the power supplied to the furnace;

(b) means for producing a second signal proportional in magnitude to the predetermined power factor level;

(c) means for comparing said first signal with said second signal to produce a differential output, and (d) means responsive to said differential output for changing the transformer tap in a direction to cause said first signal to become approximately equal to said second signal.

12. An electric arc furnace control system according to claim 11 wherein said differential output has one polarity when said first signal is greater than said second signal and another polarity when said second signal is greater than said first signal, and said transformer tap changing means respond in the direction determined by the polarity of said differential output.

13. An electric arc furnace control system according to claim 12 wherein said transformer tap changing means includes sequentially-operated power circuit breaking means and electrode drive means for withdrawing the electrode, breaking the circuit, changing the tap position, advancing the electrode and closing the circuit.

References Cited

UNITED STATES PATENTS 2,419,988  5/1947  Davis _______________ 13—13
3,209,060  9/1965  Borrebach ___________ 13—13

BERNARD A. GILHEANY, *Primary Examiner.*

ROY N. ENVALL, JR., *Assistant Examiner.*